No. 11,944. Reissued Nov. 12, 1901.
C. W. WHITE.
COTTON CLEANING AND MATTRESS STUFFING MACHINE.
(Application filed Jan. 19, 1900.)
3 Sheets—Sheet 1.
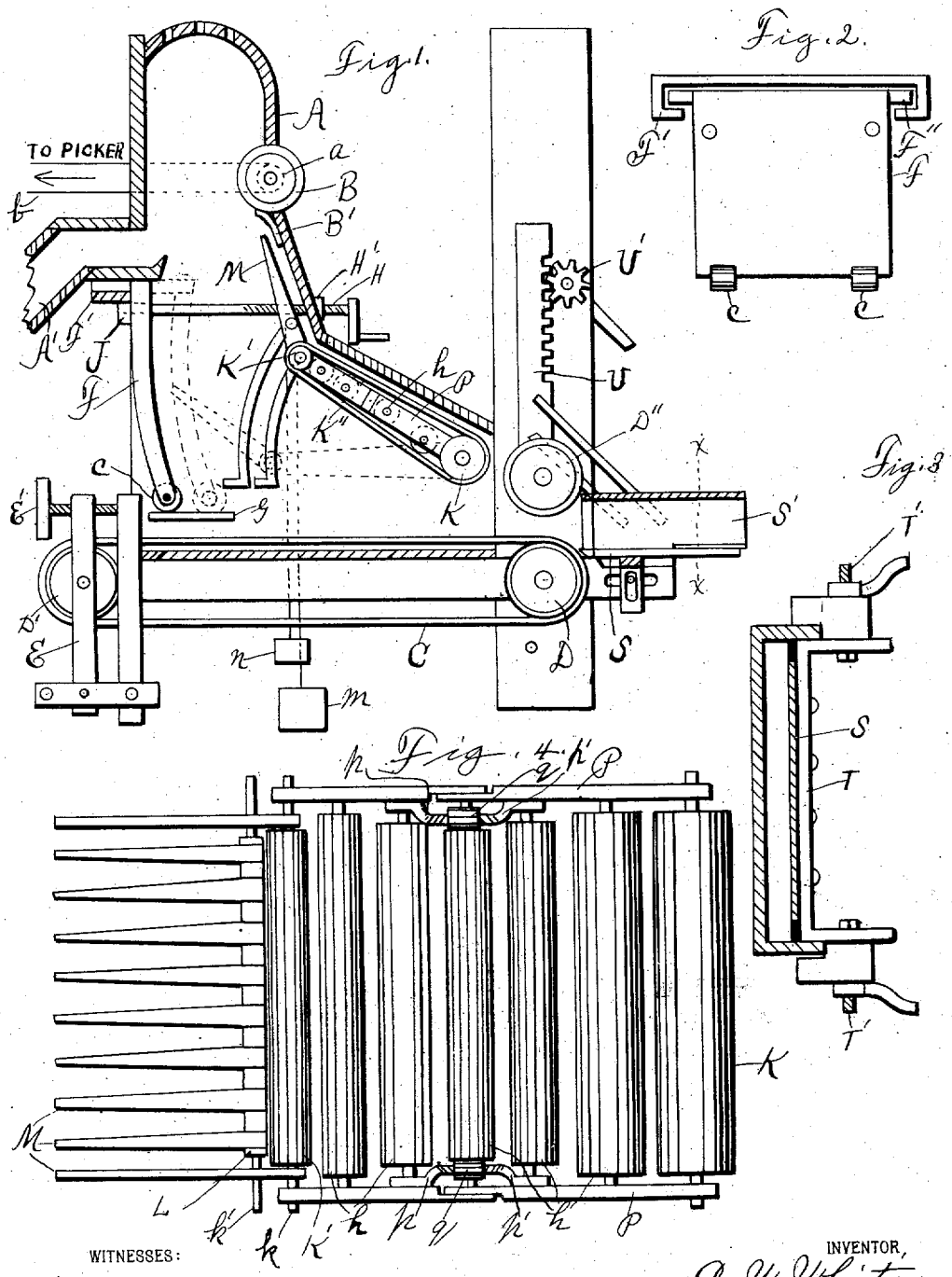
WITNESSES:
B. F. Bouldin
J. M. Mothershead
INVENTOR,
C. W. White,
BY
A. L. Jackson,
ATTORNEY.
THE NORRIS PETERS CO., WASHINGTON, D. C.

No. 11,944. Reissued Nov. 12, 1901.

C. W. WHITE.

COTTON CLEANING AND MATTRESS STUFFING MACHINE.

(Application filed Jan. 19, 1900.)

3 Sheets—Sheet 2.

WITNESSES:

J. M. Mothershead

B. F. Bouldin

INVENTOR,

C. W. White,

BY

A. L. Jackson,

ATTORNEY.

THE NORRIS PETERS CO., WASHINGTON, D. C.

No. 11,944. Reissued Nov. 12, 1901.

C. W. WHITE.

COTTON CLEANING AND MATTRESS STUFFING MACHINE.

(Application filed Jan. 19, 1900.)

3 Sheets—Sheet 3.

WITNESSES:

J. M. Mothershead

B. F. Bouldin.

INVENTOR,

C. W. White,

BY

A. L. Jackson.

ATTORNEY.

THE NORRIS PETERS CO., WASHINGTON, D. C.

UNITED STATES PATENT OFFICE.

CHARLES WILLIS WHITE, OF WACO, TEXAS, ASSIGNOR, BY DIRECT AND MESNE ASSIGNMENTS, TO WHITE MATTRESS MACHINE CO., OF WACO, TEXAS.

COTTON-CLEANING AND MATTRESS-STUFFING MACHINE.

SPECIFICATION forming part of Reissued Letters Patent No. 11,944, dated November 12, 1901.

Original No. 599,049, dated February 15, 1898. Application for reissue filed January 19, 1900. Serial No. 2,085.

*To all whom it may concern:*

Be it known that I, CHARLES WILLIS WHITE, a citizen of the United States, residing at Waco, Texas, have invented certain new and useful Improvements in Cotton-Cleaning and Mattress-Stuffing Machines, (for which Letters Patent were granted to me February 15, 1898, No. 599,049,) of which the following is a specification.

This invention relates to improved machinery for cleaning cotton, forming it into bats and discharging the bats into mattress-ticks; and the object is to perform all these different steps in one continuous operation from the time the cotton is put in the gin or picker till it is forced into ticks. I accomplish all this by the novel construction and combination of parts hereinafter fully described, and more particularly pointed out in the claims.

Reference is had to the accompanying drawings, forming a part of this specification.

Figure 5:
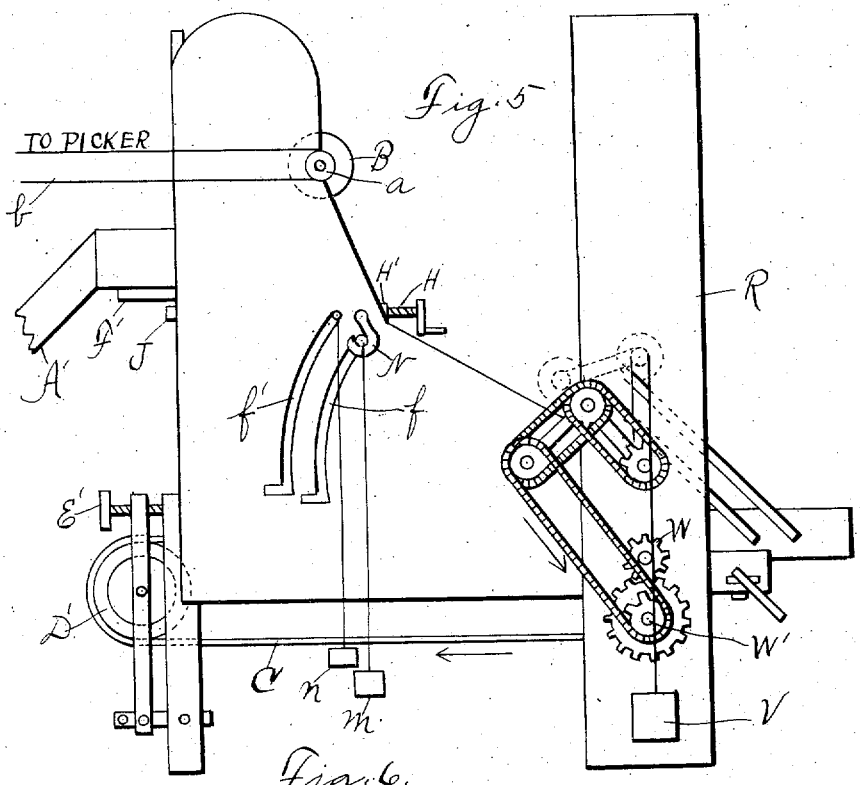
Figure 6:
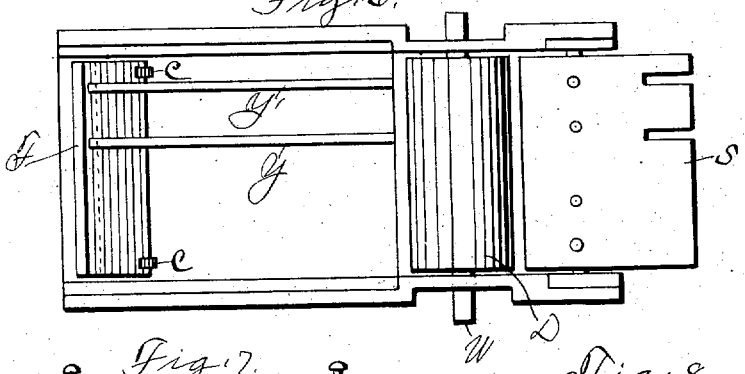
Figure 7:
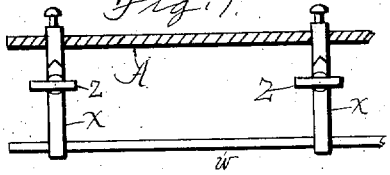
Figure 8:
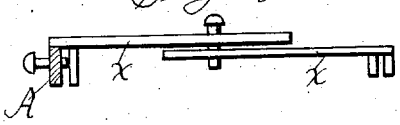
Figure 9:
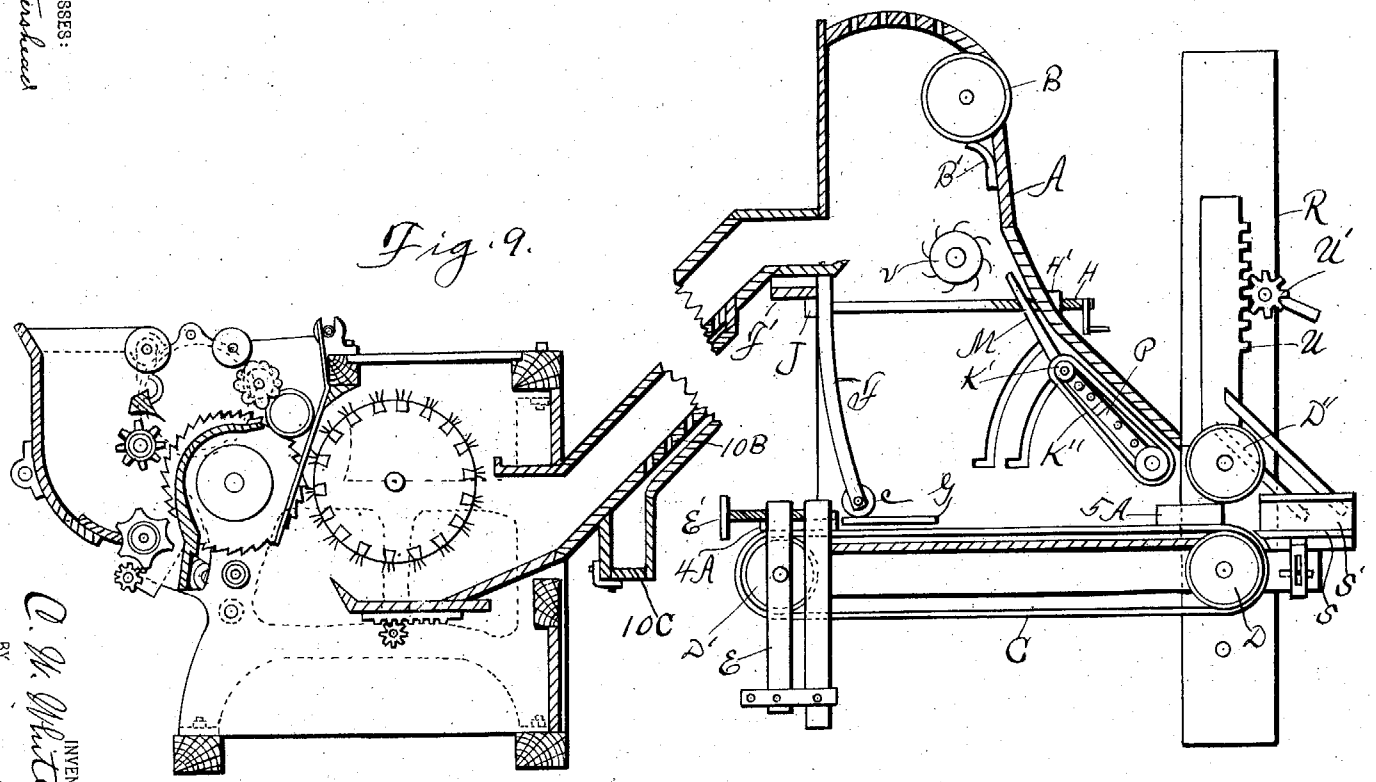

Figure 1 is a side elevation of the invention, the nearer side being removed to show the interior arrangement. Fig. 2 is a detailed view showing the adjustable end for making different-sized bats. Fig. 3 is a cross-section through line X X of Fig. 1. Fig. 4 is a plan view of a frame for pressing the cotton as soon as there is cotton enough to form the bat, this frame being connected to another frame bearing a traveling apron constituting an auxiliary delivery to the compress-rollers. Fig. 5 is a side elevation of the cleaning and bat-forming machine. Fig. 6 is a plan view of a bottom for making different-sized mattresses and also a plan of the lower piece of the tick-holder. Fig. 7 is a detailed view showing the manner of adjusting the false sides in an open-top box. Fig. 8 is a side elevation of means for adjusting the false sides. Fig. 9 is a vertical sectional view of a gin or picker and stuffing-machine, showing the cleaning devices.

Similar characters of reference indicate similar parts throughout the several views.

In carrying out the object of this invention I use a gin or picker for preparing material for mattresses. The gin or picker (illustrated in Fig. 9) is adapted to gin lint-cotton. This gin is provided with a chute A′, leading to the cleaner and condenser box. This chute has a perforated partition $10^B$ and a dirt-box, provided with a suitable door. The dirt will fall through the partition and go into the dirt-box, whence it can be removed. The material is partially cleaned and blown into a box to be more thoroughly cleansed and formed into batting ready to be compressed and stuffed into ticks. I have an improved cleaner-box A, mounted on suitable supports. The top of this box is perforated to allow dust and the air to escape upward, leaving the cotton clean. This box is adjusted to the chute A′ of a gin or picker and is provided with a roller B, which is covered with perforated material. Air escapes through this roller, and some cotton will cling to the surface of the roller. A piece of rubber B′ or other suitable material is nailed to the box A and is adapted to scrape off any cotton that may cling to the roller B. This roller is operated by a pulley *a* and a belt *b*, driven by a gin or picker motive power. The cotton falls in a box on a traveling belt or apron C, mounted on rollers D and D′, running through the lower part of box A. The tension of this belt is regulated by the pivoted support E, which is regulated by a hand-screw E′.

In order to regulate the length of mattress, the lower back end F of the box is made adjustable. The top of this back has a piece F″ attached to it, which extends back and slides back and forth in a box F′. (See Fig. 2.) Antifriction-rollers *c c* are put on the bottom of the adjustable back end F. These rollers move back and forth on a platform G, mounted in the sides of the box just above apron C. This platform prevents the back piece from coming in contact with apron C. Rods H, operating in nuts H′ and having swivel connections J, are used to move back F to the desired position. The dotted lines in Fig. 1 indicate how far this back piece may be drawn in. The nuts H′ are mounted in the box A. In manufacturing mattresses an allowance must be made for shrinkage, and a greater allowance must be made for some material than others. Seven feet of material laid in the box will be condensed or shortened to six feet two or four inches by the time it passes through the roller-pass and is forced into the tick. Therefore an allowance must be made, and an adjustment is necessary. The thickness of the mattress is regulated by the amount of material ginned into the condenser-box. A pressing-frame is mounted to operate in the box A. This frame prepares the bat for final compression. A roller K is journaled in the sides of box A. One end of this frame is mounted on the shaft of roller K. A roller K′ is mounted on the other end of this frame, and a traveling apron K″ is mounted on these rollers. A cotton-collector is mounted on the shaft of roller K′. This collector consists of a cross-piece L, having ends extending through the sides of box A and having a number of fingers halved into it. These fingers aid in collecting the cotton into bats. Weights *m* and *n* are attached to the shaft *k* and cross-piece L to aid in pressing the cotton into bats. There are curved slots *f f′* in the sides of box A for lowering the shaft *k* and cross-piece L. While enough cotton is being ginned or picked to form a bat these frames are held against the front and upper part of box A in any suitable way, as by hooks N, which may catch under the shaft *k* and cross-piece L. In order to prevent belt K″ from being pressed up by the cotton-bat while being conveyed to the compression-rollers, small rollers *h* are journaled in the frame P, so that they will hold belt K″ down. In this way friction on the belt is avoided. The dotted lines indicate the lowest position to which this frame can be brought. The tension of belt K″ is regulated by the frame P. The sides of this frame are made in two pieces, and the pieces are dovetailed or halved into each other, and rods *p p′* are attached to the sections of the sides. These rods are coupled together by the doubling or coupling nuts *q*, which have right threads in one end and left threads in the other, the threads of the rods being made to mesh with the threads in the nuts. The pressure-frame is used to press the material down to a position low enough for the partially-compressed material to be forced by the traveling aprons between the compression-rollers into the tick. Roller K may be mounted in movable bearings, so that the pressure-frame will not have too-limited up-and-down motion. The belt C constitutes the lower part of the compression-chamber. As the material is thrown from the gin or picker it comes in contact with a roller *v*, which is provided with iron rods curved back. This roller, with the rods, beats and disintegrates the material, the dust going out through the perforations in the condenser and the stuffing material falling in the condenser in a loose condition, forming an incomplete bat. Something is necessary to collect this incomplete batting. The belt C runs just above the floor of the box A. The bat has an exit-pass through or between and beyond the rollers D and D″. The sides of the box pass on the inside of and are halved into the uprights R. The bat is received from roller D on a scraper S, which is the bottom part of the former-box and tick-holder. This scraper is mounted on an L-shaped piece T, which is bolted to the side frame-pieces of box A. The legs of piece T and the ends of the side pieces have plates through which clamp-screws T′ work. The scraper can be adjusted so that it can be brought almost to roller D, which is mounted in stationary bearings. The upper part of the tick-holder and former-box S′ is mounted at the exit side of the roller-pass. The tick is stretched over the tick-holder, and the tick is drawn off by filling that is forced into it. Any simple device may be used to prevent the too-rapid paying off of the tick. This upper part of the tick is attached to the rack U, in which is mounted roller D″. This roller is raised and lowered by means of the racks U and the pinions U′. Pressure is exerted upon roller D″ by means of weights V. The rollers are operated in any suitable way, as by sprocket-gearing. (Illustrated in Fig. 5.) A drive-wheel may be mounted on a center-shaft W′.

For making bats for pillows and narrow mattresses false sides or partitions *y y′* are put in bat-forming box and slots are cut in tick-holder, as illustrated in Fig. 6. Figs. 7 and 8 illustrate devices for holding false sides W and at any distance desired. The arms or cross-pieces X X are held in place by clamp-screws *z z*. The false sides have anti-friction-rollers on bottom edges to prevent friction on the carrier-bottom C. One end of the cross-piece X is attached to side of the box A. By the means thus described the widths of the mattresses are controlled.

Two pads $4^A$ and $5^A$ are passed through the stuffing-machine, one of which is held between the compression-rollers and apron C while material is being ginned into the cleaner and condenser box to prevent loose material from escaping. The other pad is placed on belt C and acts as a follower to shove the material through the roller-pass into the tick. The pads are not attached to the apron, but are put in position by hand. These pads are made of some flexible material and aid in giving proper shape to the ends of a mattress and aid in forcing the formed material into the tick. The pad between the compression-rollers prevents the escape of the batting material.

The mattress is run through the stuffing-machine the second time to compress it, so that the material will fill the corners of the tick.

Having fully described my invention, what I claim as new, and desire to secure by Letters Patent, is—

1. A mattress-stuffing machine having compression-rollers and traveling endless aprons, one being mounted above the other, adapted to convey incomplete batting to said rollers and means for applying pressure to the upper one of said aprons.

2. A mattress-stuffing machine having compression-rollers, means for collecting and forming the cotton into bats, traveling endless aprons, one being mounted above the other, adapted to convey the incomplete batting to said rollers, and rollers for applying pressure to the lower part of the upper one of said aprons, substantially as described.

3. A mattress-stuffing machine having compression-rollers, a cleaning and collecting box, traveling aprons one running within and the other running through said box, and an auxiliary pressing-frame adapted to operate in connection with the upper one of said aprons, said aprons being adapted to convey the incomplete batting to said rollers.

4. A mattress-stuffing machine provided with means for collecting and cleaning material preparatory to forming bats, said means consisting of a box adapted to receive the material from a gin or picker, said box having perforations for the escape of air and dust, a pressing-frame operating in said box, and means for applying pressure to said frame.

5. A mattress-stuffing machine provided with means for pressing cotton into bats, said means consisting of a box, an endless apron traveling through said box, a second apron mounted within said box, rollers journaled in said box for said second apron, rollers for applying pressure to the lower part of said second apron and means for driving said aprons.

6. A mattress-stuffing machine having compression-rollers, a box for cleaning and collecting the stuffing material, said box being provided with an adjustable back end whereby the length of the mattress may be determined, and means for conveying said material to said rollers.

7. A mattress-stuffing machine provided with a cleaning and collecting box, partitions in said box whereby batting material is collected into bats of different widths, traveling endless aprons, one of said aprons running within said box, adapted to convey the batting to be compressed, and an auxiliary frame adapted to start the stuffing material between said aprons.

8. A mattress-stuffing machine having compression-rollers, a conveyer-apron suitably mounted and adapted to carry stuffing material to said rollers, and an auxiliary conveyer-apron mounted above said first-named apron and adapted to aid the same and means for applying pressure to the lower part of said upper apron.

9. A mattress-stuffing machine having compression-rollers, a traveling apron adapted to convey stuffing material to said rollers, a second traveling apron and rollers therefor, suitable supports for said rollers, said second apron having a pivoted mounting at one end, a frame mounted in said second apron and intermediate rollers in said frame whereby pressure is applied to the bottom part of said second apron, said aprons being adapted at times to travel with the adjacent parts in parallel planes and in the same direction.

10. In a mattress-stuffing machine, the combination of a receiving and cleaning box, collecting and conveying devices mounted in said box, compression-rollers adapted to receive the stuffing material from said conveying devices, suitable driving mechanism, and a tick-holder adapted to support a tick adjacent to the said compression-rollers for receiving the mattress-bat as delivered from the machine.

11. In a mattress-stuffing machine, the combination of a receiving and cleaning box, conveying-aprons running in said box, means for applying pressure to the lower part of one of said aprons, compression-rollers journaled in a suitable frame, and exit-pass and tick-holder, whereby batting is prepared from raw material and stuffed into ticks in one continuous operation.

12. In a mattress-stuffing machine, the combination of a cleaning and collecting box, conveying-aprons running in said box, a back end adjustably mounted in said box adapted to determine the length of bats, compression-rollers, means for rotating and raising said rollers, and a tick-holder.

13. In a mattress-stuffing machine, the combination of a receiving and cleaning box, traveling endless aprons running in said box, false sides mounted in said box adapted to regulate the widths of batting, compression-rollers journaled in a suitable frame, and a tick-holder having slots therethrough whereby ticks of different widths are held.

14. In a mattress-stuffing machine, the combination of a cleaning and condensing box, endless aprons running in said box, devices mounted in said box adapted to determine the length and width of batting, compression-rollers journaled in a suitable frame, and a tick-holder adapted to hold ticks of different widths.

15. A mattress-stuffing machine provided with a collecting and cleaning box, a frame mounted in said box for aiding in collecting material to form batting, an auxiliary apron mounted in said frame, means for applying pressure to said frame, an endless apron operating in conjunction with said auxiliary apron to press the material into a bat.

16. A mattress-stuffing machine comprising a chamber for receiving the material to be made into a bat, means in said chamber for cleaning and collecting material preparatory to forming bats, said chamber having provisions in the wall thereof for the escape of air and dust, means within said chamber for mechanically compressing the material into bats, a tick-holder adapted to support a tick into which the bat may be discharged.

17. A mattress-stuffing machine comprising a box or chamber for receiving the material from a gin or picker, said chamber having perforations in the wall thereof, means within the chamber for cleaning and condensing the material preparatory to forming bats, means within the chamber for compressing the material therein, and a tick-holder located outside of said chamber for holding the tick and directing the material thereinto as it passes from the machine.

Signed in the presence of two witnesses.

CHARLES WILLIS WHITE.

Witnesses:
J. C. GRESHAM,
JOE LEHMANN.